April 20, 1926.
P. O. BROWN
AUTOMATIC SPEED RECORDING DEVICE
Filed Nov. 10, 1925
1,581,718
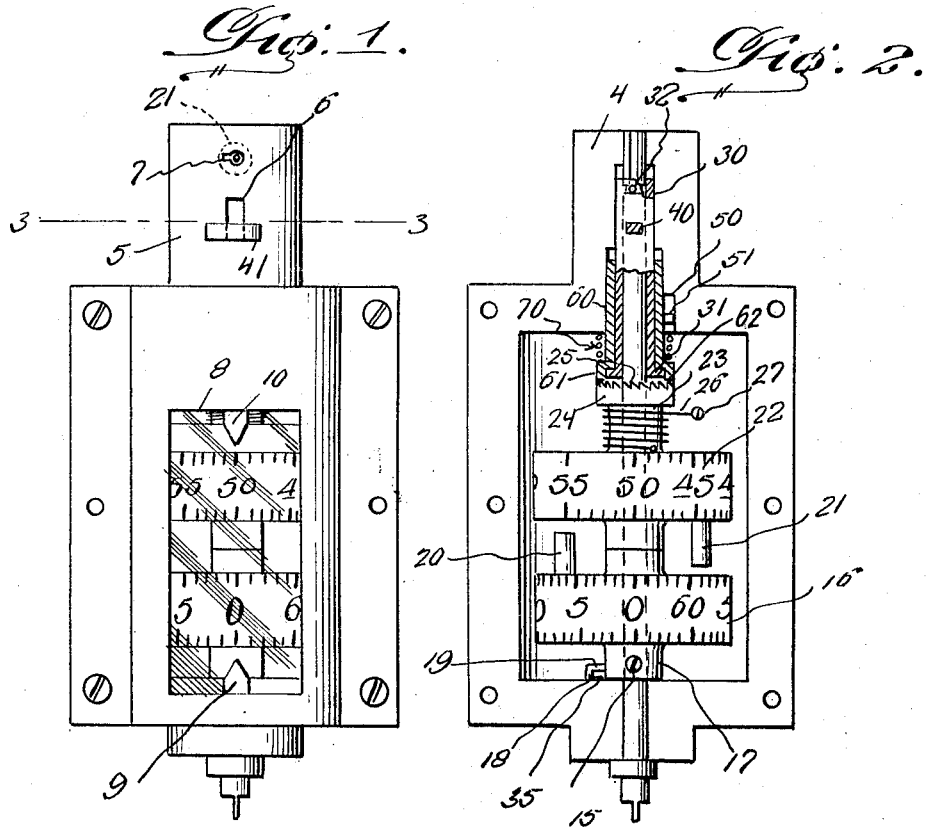
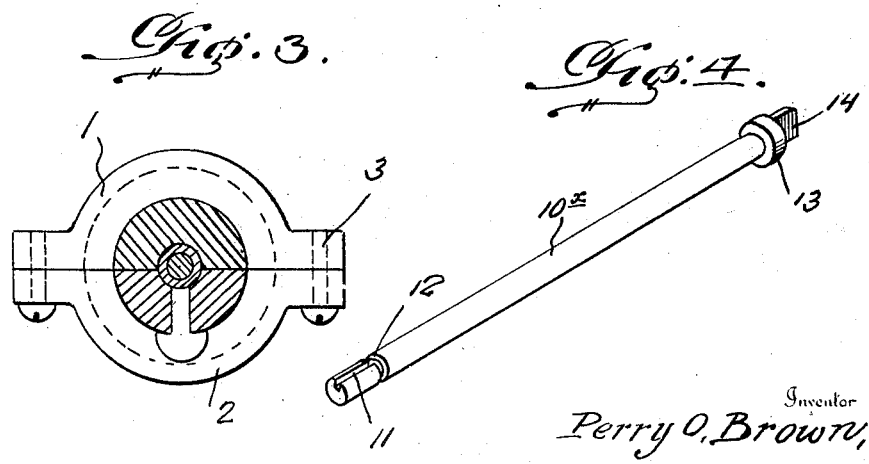
Inventor
Perry O. Brown,
By Clarence A. O'Brien
Attorney Patented Apr. 20, 1926.

1,581,718

UNITED STATES PATENT OFFICE.

PERRY O. BROWN, OF ST. VINCENT, MINNESOTA, ASSIGNOR OF ONE-HALF TO GUSTAF V. BACKSTROM, OF ST. VINCENT, MINNESOTA.

AUTOMATIC SPEED-RECORDING DEVICE.

Application filed November 10, 1925. Serial No. 68,123.

*To all whom it may concern:*

Be it known that I, PERRY O. BROWN, a citizen of the United States, residing at St. Vincent, in the county of Kittson and State of Minnesota, have invented certain new and useful Improvements in Automatic Speed-Recording Devices, of which the following is a specification.

My present invention has to do with the speed of automobiles and the better enforcement of laws for controlling the operation of automobiles.

One object of my said invention is the provision of means for accurately recording the speed attained in an automobile incident to a specific traverse thereof.

Another object of the invention is the provision of recording means as indicated designed and adapted to be employed in association with speedometer means which may be of the conventional type or of any other character consonant with the purpose of my invention, this portion of my invention providing for the indication of the speed at different times during the traverse of an automobile, and for recording the maximum speed attained during the traverse, so that if a motorist is accosted by a traffic policeman, the motorist by reference to the speed record means will be enabled to satisfy the policeman on the point of the highest speed reached in the run immediately preceding the stoppage.

After a use of the same the speed record means of my invention is adapted to be conveniently returned to zero position and is then in readiness for another operation.

With the foregoing in mind, my present improvement in all of its details will be fully understood from the following description and claims when the same are read in connection with the drawings, accompanying and forming part of this specification, in which:—

Figure 1 is a front elevation of the device constituting the best practical embodiment of my present invention of which I am cognizant.

Figure 2 is a front view of the device, with some parts in section and as the device appears when the front section of the casing body is removed.

Figure 3 is a horizontal section taken in the plane indicated by the line 3—3 of Figure 1.

Figure 4 is a perspective of the vertical central shaft of the device.

Similar numerals of reference designate corresponding parts in all of the views of the drawings.

The casing body of the device disclosed comprises a back section 1 and a front section 2, the said sections being detachably connected together at 3, and being provided with reduced upper portions 4 and 5, respectively; the said reduced portion 5 of the front section 2 being provided with a vertical slot 6 and being preferably, though not necessarily, provided with a keyhole slot 7 for use in connection with a lock (not shown), when it is deemed expedient to employ a lock in association with the improvement.

The front section 2 of the casing body is provided with an appropriately glazed opening 8, and is also provided with a lower fixed pointer 9 and an upper fixed pointer 10, Figure 1.

A vertical central shaft $10^x$ extends throughout the height of the casing body and depends slightly from the body as appears in Figures 1 and 2. The said shaft $10^x$ is characterized by a longitudinal slot 11 in its upper end portion, a circumferential slot 12 communicating with the lower end of the slot 11 and constituting an important feature of my invention, a head 13 for arrangement in abutting relation to the lower end of the casing body and a terminal 14 of angular form in cross section at the lower end of the shaft. Fixed at 15 on the shaft $10^x$ and arranged within the casing body is a rotary disk 16 having on its periphery a mileage scale as illustrated in Figures 1 and 2. At this point I would have it understood that in accordance with the preferred embodiment of my invention, the disk 16 is rotated in the same manner as the corresponding disk of a speedometer, the motion being transmitted to the disk 16 through the medium of the shaft $10^x$. The pointer 9 is arranged for cooperation with the disk 16 to indicate the speed at which an automobile is travelling, and the said disk 16 is provided with a pendent boss 17 on which is a projection 18, designed when the disk 16 returns in conventional manner to the zero point to bring up against an abutment 19, fixed in the casing body. On the upper side of the disk 16 and off the center thereof is a projection 20 for cooperation with a pendent projection 21 on the record disk 22 the said record disk 22 being provided on its periphery with a mile scale for indicating the number of miles per hour, and being also provided with a pendent boss superposed on a corresponding boss at the upper side of the disk 16. Said disk 22 is loose on and therefore adapted to freely turn about the shaft 10ˣ, and, as will be readily understood, the shaft 10ˣ is capable of free rotation in and independent of the disk 22. The pointer 10 is for use in conjunction with the record disk 22.

Fixed with respect to the disk 22 and extending upwardly therefrom is a tubular extension 23 which terminates in a head or enlargement 24 having a clutch face 25. A spring 26 surrounds the said extension 23 and is connected at one end to the record disk 22, and at its opposite end to the casing body, the latter at the point 27. Surrounding the upper portion of the shaft 10ˣ is a sleeve 30 having a flange 31 at its lower end, and also having at 32, Figure 2, an inwardly directed pin for use in conjunction with the grooves 11 and 12 of the shaft 10ˣ. It will also be noted that a finger piece 40 is connected to the rectilinearly movable but non-rotatable sleeve 30. Said finger piece 40 being movable upwardly and downwardly in the slot 6 of the casing body and being provided at its forward end with a head 41 as shown in Figures 1 and 3. A vertical keyway 50 is formed in the casing body for the reception and play of a key 51 on a vertical, rectilinearly movable outer sleeve 60, the said outer sleeve 60 having a lower enlarged portion 61 in which is disposed the flange 31 of the sleeve 30, and which has a clutch face 62 that is the complement of and is opposed to the clutch face 25 on the upward extension of the record disk 22.

Proceeding on the assumption that the shaft 10ˣ and the disk 16 are rotated in the same manner and by the same means as the corresponding parts of an ordinary speedometer, the mode of use and the practical advantages of my improvement will be readily appreciated. For instance it will be understood that the disk 16 operating in the usual manner will serve to apprise an automobile driver of the different speeds at which the automobile is travelling at different times; and it will also be understood that the disk 16 by cooperation of the projections 20 and 21 will turn the record disk 22 so that the highest speed attained by the automobile incident to the traverse thereof will be recorded by the disk 22 in cooperation with the pointer 10, the outer sleeve 60 by virtue of its clutch face serving to prevent retrograde movement of the record disk 22 notwithstanding the fact that the outer sleeve 60 has the capacity of freely moving upward so as not to interfere in any measure with the turning of the disk 22 under the cooperation of the two projections 20 and 21.

It will be apparent from the foregoing that after a traverse of an automobile equipped with my improvement, the highest speed at which the automobile has traveled at any time during the traverse will be recorded by my novel device and hence may be readily ascertained.

After ascertainment of a maximum speed attained by the automobile, the disk 22 may be quickly and easily returned to zero position for repeated use. I would here have it understood, however, that it is impossible to so return the record disk 22 to zero position except when the automobile is at a standstill, and the shaft 10ˣ is idle. This will be readily understood when it is stated that as a condition precedent to the return of the disk 22 to zero position by the action of the spring connected to the disk 22 and which spring is tensioned by the working rotation of the disk 22, it is necessary to move the sleeve 60 upwardly so as to disengage its clutch face from the clutch face on the upward extension of the disk 22, and the sleeve 60 is raised through the medium of the sleeve 30, and said sleeve 30 cannot be raised until the pin 32 of sleeve 30 is coincident with the shaft groove 11, upward movement of the pin 32 in said groove 11 being absolutely essential to permit of upward movement of the sleeve 30. When, however, the sleeves 30 and 60 are raised under the condition and at the time stated, the spring complementary to the disk 22 will operate to immediately return the disk 22 to zero position and to yieldingly maintain the said disk 22 in said position. A spring 70 is coiled about the outer sleeve 60 between the enlargement thereof and the upper wall of the chamber in the casing body, and operates to yieldingly maintain the said sleeve 60 in position to efficiently cooperate with the clutch face on the upper extension of the disk 22.

In addition to the capacity of function ascribed to my novel device, it will be noted that the device is advantageous because of its simplicity and compactness and also because it is adapted in all respects to withstand the usage to which devices of corresponding character are ordinarily subjected.

I have specifically described the construction and relative arrangement of the elements comprised in the present and preferred embodiment of my invention in order to impart an exact understanding of said embodiment in all of its details. I do not desire, however, to be understood as confining myself to the disclosed structure and relative arrangement of parts, my invention being defined by my appended claims within the scope of which modifications in structure and arrangement may be made without departure from my invention.

Having described my invention, what I claim and desire to secure by Letters-Patent, is:—

1. In combination, speed indicating means, and speed recording means operable by the speed indicating means; the said speed recording means including a pointer, a rotary disk bearing data indicative of miles per hour, and having an annular clutch, a gravitational annular clutch opposed to the said annular clutch of the disk, said clutches arranged about a portion of the speed indicating means, and means arranged to be tensioned by the rotation of the disk to recording position and adapted on the release of the disk from the gravitational clutch to return the disk to zero position.

2. In combination, speed indicating means, and speed recording means operable by the speed indicating means; the said speed recording means including a pointer, a rotary disk bearing data indicative of miles per hour, and having a clutch, a gravitational clutch opposed to the said clutch of the disk, and means arranged to be tensioned by the rotation of the disk to recording position and adapted on the release of the disk from the gravitational clutch to return the disk to zero position; the said gravitational clutch being carried by a rectilinearly movable non-rotatable sleeve, and a second sleeve for lifting purposes disposed in the first named sleeve and having a projection and a shaft held against upward movement and having a circumferential groove to receive said sleeve projection and also having a longitudinal groove for the upward movement of the sleeve and the gravitational clutch to release the record disk and permit of the return of the same to zero position.

3. In a device for the purpose described, the combination of a casing body with lower and upper pointers, a speed indicating disk rotatable in the casing body and having a projection, a speed record disk superposed on the first named disk and having a pendent projection for cooperation with the projection of the first named disk and also having an upper extension terminating in a clutch member, a spring connected with the record disk in the casing body for returning said disk to zero position, a gravitational clutch member opposed to that of the record disk, a shaft through which motion is transmitted to the speed indicating disk, said shaft having a circumferential groove and a longitudinal groove in communication therewith, and a sleeve for lifting the gravitational clutch member, said sleeve receiving said shaft and having a finger piece for its convenient manipulation and also having a pin positioned during operation of the speed indicating disk in the circumferential groove of the shaft and adapted when the gravitational clutch member is to be raised to move upwardly in the longitudinal groove of the shaft.

4. In combination, rotary means for use in the indication of vehicle speed, a rotary member for use in the recordation of the highest speed attained during a traverse of a vehicle, said member operable by the rotary part of the speed indicating means, and the driving connection to the rotary member of the recordation means including a gravitational clutch, means for lifting said clutch for the return of the rotary member to zero position, and means whereby lifting of the clutch and release of the rotary member of the recordation means is prevented save when the speed indicating means is idle.

5. The combination of a shaft with a circumferential groove and a longitudinal groove in communication with said circumferental groove, a casing body in which said shaft is rotatable, a speed indicating disk fixed to the shaft and having a projection, a speed recording disk having a projection opposed to that of the first-named disk, pointers for cooperation with said disk, a clutch member on the speed record disk, a spring for returning said disk to zero position, a rectilinearly movable non-rotatable sleeve having a clutch face opposed to the clutch of the record member, and a second and lifting sleeve having a finger piece and also having a pin for cooperation with the grooves of the shaft.

6. In combination, rotary means for use in the indication of vehicle speed, a rotary member for use in the recordation of the highest speed attained during a traverse of a vehicle, said member operable by the rotary part of the speed indicating means, and the driving connection to the rotary member of the recordation means including a clutch, means for moving said clutch to permit return of the rotary member to zero position, and means whereby said movement of the clutch and release of the rotary member of the recordation means is prevented save when the speed indicating means is idle.

In testimony whereof I affix my signature.

PERRY O. BROWN.